United States Patent [19]

Yoshida

[11] Patent Number: 4,792,855
[45] Date of Patent: Dec. 20, 1988

[54] NOISE REDUCING CIRCUIT FOR VIDEO SIGNAL

[75] Inventor: Masaji Yoshida, Yokohama, Japan

[73] Assignee: Victor Company of Japan, Ltd., Yokohama, Japan

[21] Appl. No.: 155,539

[22] Filed: Feb. 12, 1988

[30] Foreign Application Priority Data

Feb. 13, 1987 [JP] Japan ................................. 62-31118

[51] Int. Cl.⁴ ........................................... H04N 5/213
[52] U.S. Cl. ................................... 358/167; 358/37
[58] Field of Search ................ 358/167, 166, 36, 37, 358/174

[56] References Cited

U.S. PATENT DOCUMENTS

| 4,194,219 | 3/1980 | Drewery | 358/167 |
| 4,249,209 | 2/1981 | Storey | 358/167 |
| 4,261,014 | 4/1981 | Lee | 358/166 |
| 4,263,616 | 4/1981 | Lee | 358/166 |
| 4,331,971 | 5/1982 | Bretl | 358/37 |
| 4,415,920 | 11/1983 | Kato et al. | 358/37 |

FOREIGN PATENT DOCUMENTS 0197767 10/1986 European Pat. Off. .
2809216 11/1978 Fed. Rep. of Germany .
58-517285 9/1983 Japan ................................. 358/36
1605025 12/1981 United Kingdom .
2098023 11/1982 United Kingdom .

Primary Examiner—James J. Groody
Assistant Examiner—E. Anne Faris
Attorney, Agent, or Firm—Lowe, Price, LeBlanc, Becker & Shur

[57] ABSTRACT

In a noise reducing circuit for a video signal comprising a first subtractor (2), a delay line (3), a second subtractor (4), a non-linear circuit (7) having a full-wave rectification circuit (7b) and a gain control circuit (7a), the gain control circuit (7a) controls a gain such that an output signal level derived from the non-linear circuit (7) increases in accordance with the increase in an output signal from the full-wave rectification circuit (7b) when the output signal level of the second subtractor (4) is within a determined extent, and that the output signal level derived from the non-linear circuit (7) decreases in accordance with the increase in the output signal from the full-wave rectification circuit (7b) when the output signal level of the second subtractor (4) is out of the determined extent.

5 Claims, 4 Drawing Sheets

FIG. 4
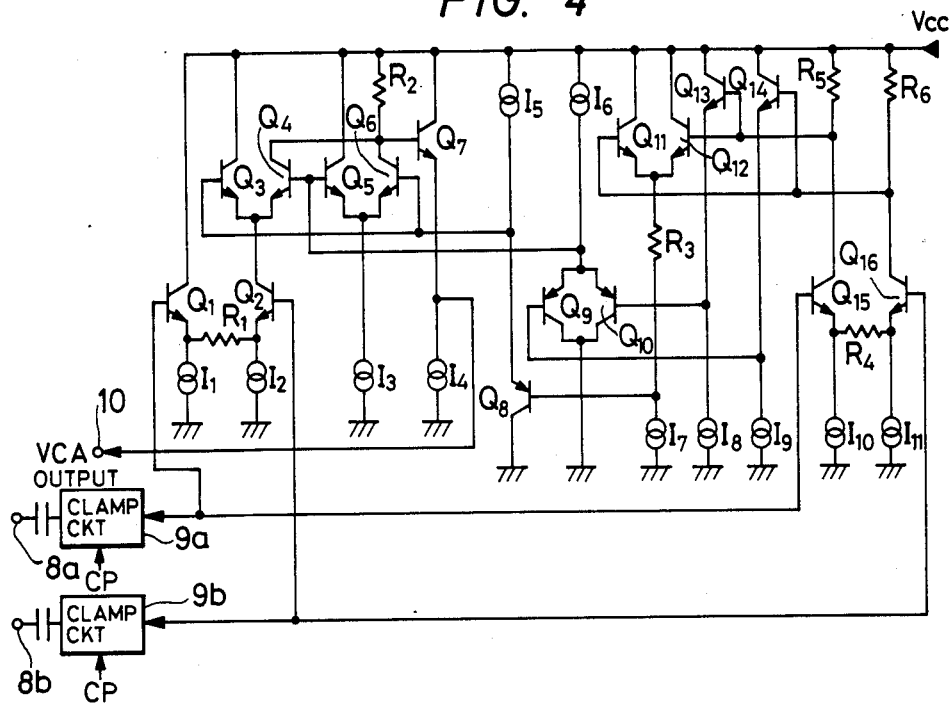
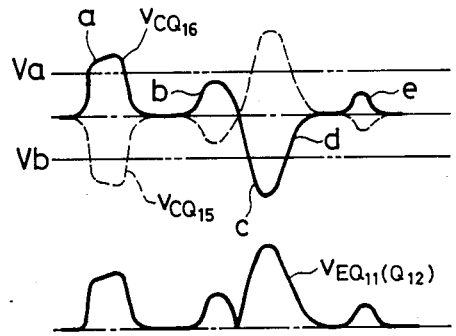
FIG. 5A
FIG. 5B
FIG. 5C
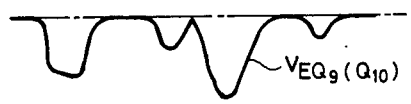
FIG. 5D
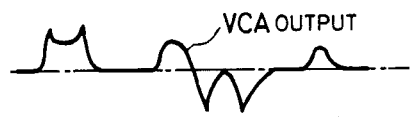

4,792,855

NOISE REDUCING CIRCUIT FOR VIDEO SIGNAL

BACKGROUND OF THE INVENTION

1. Field of the Invention

This invention relates generally to noise reducing circuit, and particularly to a circuit for suppressing noise in an output video signal of a video tape recorder, a video camera, a video disc player, or the like by utilizing a line correlation, a field correlation, or a frame correlation in the video signal.

2. Prior Art

As is well known in the prior art, noise reducers suppress noise in an output video signal by utilising a correlation such as a line correlation, a field correlation, or a frame correlation, because a video signal has a property that the degree of correlation is high.

However, since the noise is suppressed by using a limiter, an ideal characteristic can not be obtained. Therefore, the noise is not effectively suppressed whereby images provided on a display become unclear. Besides, manufacturing cost by digitizing the noise reducing circuit become higher than the cost for analog noise reducing circuit.

SUMMARY OF THE INVENTION

The present invention has been developed in order to remove the above-described drawbacks inherent to the conventional noise reducers.

It is, therefore, an object of the present invention to provide a new and useful noise reducer which is better adapted to analog signal processing.

It is another object of the invention to provide a noise reducer having an improved non-linear characteristic than that of the conventional noise reducers each having a limiter.

In accordance with the present invention there is provided a noise reducing circuit for a video signal, comprising: a delaying means for delaying the vido signal; a first subtracting means for subtracting an output signal of the delaying means from the video signal; a full-wave rectification circuit means for full-wave rectifying the output signal from the first subtracting means; a gain control circuit means for controlling an amplitude of the output signal from the first subtracting means in accordance with an output signal from the full-wave rectification circuit means; and a second subtracting means for subtracting an output signal of the gain control circuit from the video signal thereby producing an output signal of the noise reducing circuit.

In accordance with the present invention there is also provided a noise reducing circuit for a video signal, comprising: a first subtracting means responsive to the video signal; a delaying means for delaying an output signal from the first subtracting means; a second subtracting means for subtracting an output signal of the delaying means from the video signal; a full-wave rectification circuit means for full-wave rectifying the output signal from the second subtracting means; and a gain control circuit means for controlling an amplitude of the output signal from the second subtracting means in accordance with an output signal from the full-wave rectification circuit means, an output signal from the gain control circuit being fed to the first subtracting means to be subtracted from the video signal.

BRIEF DESCRIPTION OF THE DRAWINGS

The object and features of the present invention will become more readily apparent from the following detailed description of the preferred embodiments taken in conjunction with the accompanying drawings in which:

FIG. 4 is a circuit diagram showing important circuits in the embodiment shown in FIG. 3;

FIGS. 5A–5D show waveforms in the circuit diagram of FIG. 4 for better understanding of the an operation of the noise reducers according to the present invention;

The same or corresponding elements and parts are designated at like reference numerals throughout the drawings.

DETAILED DESCRIPTION OF THE INVENTION

Figure 7:
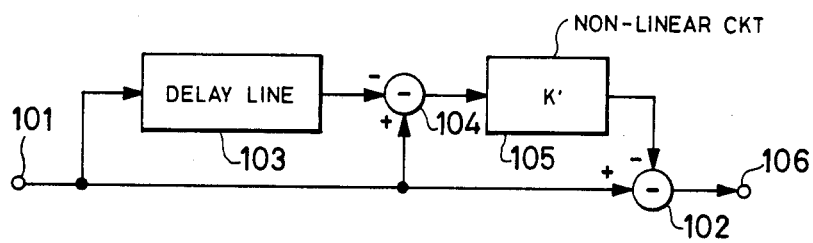
FIGS. 7 and 8 are basic schematic block diagrams of conventional noise reducers.
Figure 8:
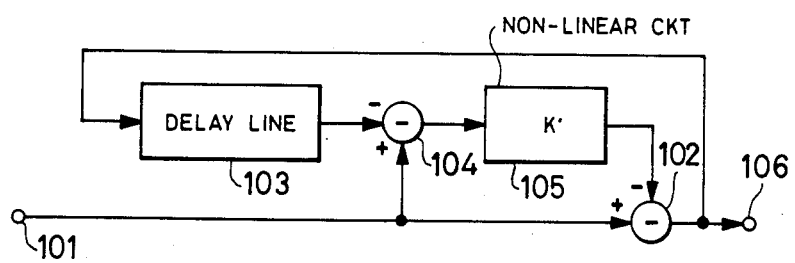

Prior to describing the preferred embodiments of the present invention, the above-mentioned conventional noise reducers will be described for a better understanding of the present invention. FIGS. 7 and 8 are basic schematic block diagrams according to the prior art. FIG. 7 shows a non-cyclic noise reducer such as a non-cyclic line noise reducer, a non-cyclic field noise reducer, or a non-cyclic frame noise reducer. FIG. 8 shows a cyclic noise reducer such as a cyclic line noise reducer, a cyclic field noise reducer, or a cyclic frame noise reducer.

In FIG. 7, the non-cyclic noise reducer comprises an input terminal 101 for receiving a video signal, a first subtractor 102, a second subtractor 104, a non-linear circuit 105, an output terminal 106, and a delay line 103 such as a line delay line, a field delay line, or a frame delay line.

Now the operation of the non-cyclic noise reducer having the above-mentioned structure will be described. The video signal inputted to the input terminal 101 is fed to an in-phase input terminal (+) of the first subtractor 102, an in-phase input terminal (+) of the second subtractor 104, and the delay line 103, and an output signal from the delay line 103 is supplied to an anti-phase input terminal (−) of the second subtractor 104. The second subtractor 104 suttracts such delayed output video signal of the delay line 103 from the video signal supplied to the input terminal 101, and the output signal from the second subtractor 104 is supplied to the non-linear circuit 105. In the non-linear circuit 105, the output signal from the second subtractor 104 is multiplied by a constant K' (0≦K'<1), and then supplied to the anti-phase input terminal (−) of the first subtractor 102. The first subtractor 102 subtracts the output signal of the non-linear circuit 105 from the video signal supplied to the input terminal 101, and the output signal from the first subtractor 102 is obtained from the output terminal 106 as an output video signal of the noise reducer. In this noise reducer, the noise is multiplied by $$\sqrt{2(K'-\tfrac{1}{2})^2+\tfrac{1}{2}}.$$

In FIG. 8, the cyclic noise reducer comprises input terminal 101 for receiving a video signal, first subtractor 102, second subtractor 104, non-linear circuit 105, output terminal 106, and delay line 103. The cyclic noise reducer has the same structure of the non-cyclic noise reducer except that the output signal from the first subtractor 102 is fed to the delay line 103 and that the input video signal is not supplied to the delay line 103. In this noise reducer, the noise is multiplied by $$\sqrt{(1-K')/(1+K')}.$$

In the above-mentioned conventional noise reducers shown in FIGS. 7 and 8, the niise depends on the degree of a correlation such as a line correlation, a field correlation, or frame correlation. When the degree of the correlation is low, images provided by the output video signal on a display are deteriorated. In order to prevent the images from such a deterioration, the following idea is provided. When an output amplitude from the second subtractor 104 is small, the degree of the correlation is regarded as high and the output from the second subtractor 104 is regarded as a noise component only. As a result, it is determined that the value of K' is 0.5 in the case of non-cyclic noise reducer shown in FIG. 7, and that the value of K' in the non-linear circuit 105 is nearly 1.0 (approximately from 0.7 to 0.9) in the case of the cyclic noise reducer shown in FIG. 8. When the output amplitude from the second subtractor 104 is large, it is determined that the value of K' shown in the non-linear circuit 105 of FIGS. 7 and 8 is 0 by regarding the degree of the correlation as low.

Figure 9:
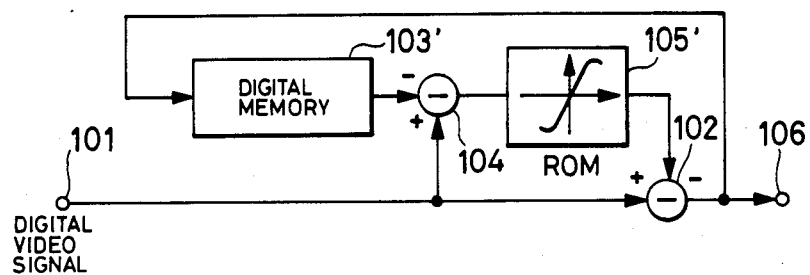
FIG. 9 is a schematic block diagram for a digital processing corresponding to FIG. 8.

The above-mentioned idea is effectively achieved by using a digital circuit. One example of the digital circuit is shown in FIG. 9. FIG. 9 shows a schematic block diagram for a digital processing corresponding to FIG. 8. In FIG. 9, a numeral 103' denotes a digital memory for a line memory, a field memory, or a frame memory, and a numeral 105' denotes a read only memory (ROM) in which an ideal non-linear characteristic is programmed.

Figure 10:
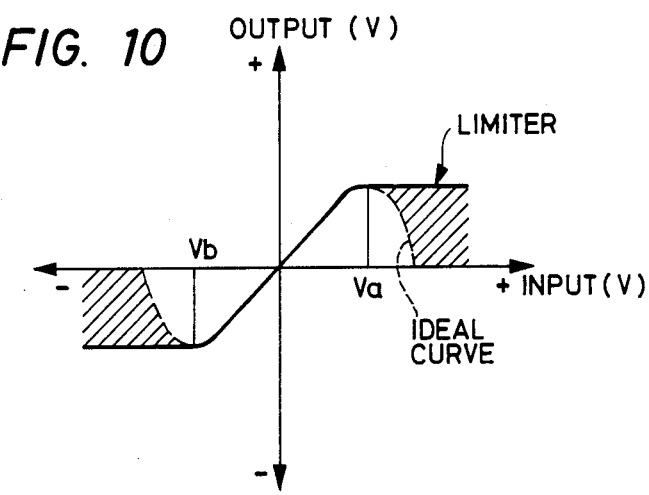
FIG. 10 is a graph showing an ideal noise reducing characteristic and a non-linear input-output characteristic of a limiter used in the conventional noise reducers.

However, in consumer appliances such as a video tape recorder, a video disk player, a video camera or the like, the above-mentioned digital processing is not put to practical use. This is because the manufacturing cost of the digital circuit for processing the video signal is higher than that of the analog circuit. Besides, in the conventional analog circuit shown in FIGS. 7 and 8, the non-linear circuit 105 is formed of a limiter. Refering to FIG. 10, a non-linear input-output characteristic by a limiter and an ideal characteristic is shown. As will be seen from FIG. 10, the using of the limiter causes the deterioration of the images on the display by the responding value in the area of hatching.

Figure 1:
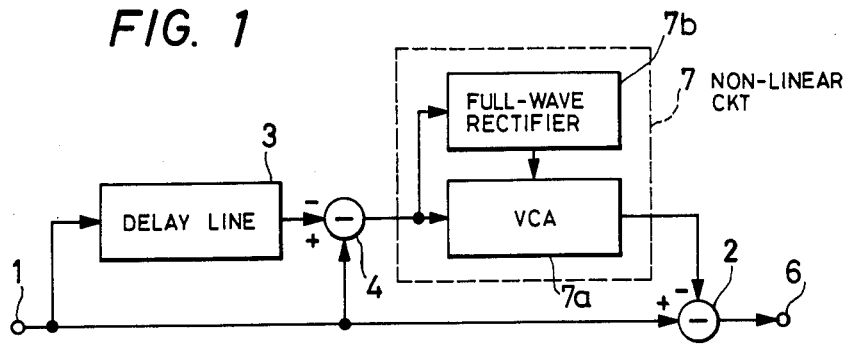
FIGS. 1 and 2 are basic schematic block diagrams of noise reducers of two different types according to the present invention.
Figure 2:
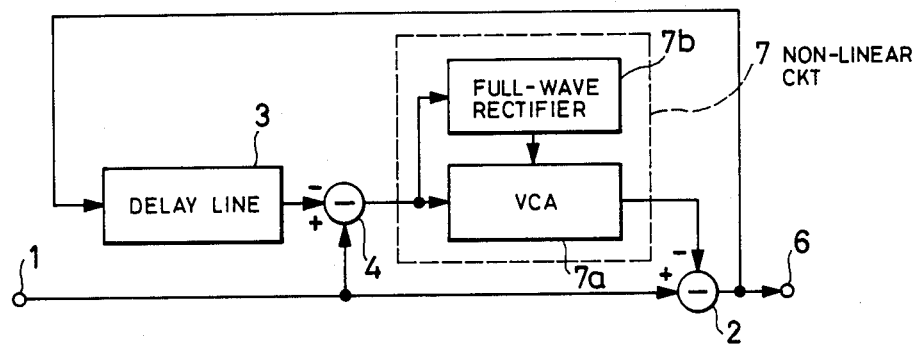

Refering now to FIGS. 1 and 2, there are shown basic schematic block diagrams of noise reducers according to the present invention. In these figures, the noise reducers respectively comprise an input terminal 1 for receiving a video signal, a first subtractor 2, a second subtractor 4, a non-linear circuit 7 having no limiters, an output terminal 6, and a delay line 3 such as a line delay line, a field delay line, or a frame delay line. The non-linear circuit 7 includes a voltage-controlled gain amplifier (VCA) 7a as a gain control circuit and a full-wave rectification circuit 7b. It is to be noted that the noise reducers of the present invention do not have any limiter.

Now the operation of the non-cyclic noise reducer having the above-mentioned structure will be described hereinbelow. In FIG. 1, a video signal inputted to the input terminal 1 is fed to an in-phase input terminal (+) of the first subtractor 2, an in-phase input terminal (+) of the second subtractor 4, and the delay line 3. The output signal from the delay line 3 is supplied to an anti-phase input terminal (−) of the second subtractor 4. The second subtractor 4 subtracts such delayed output video signal of the delay line 3 from the video signal supplied to the input terminal 1, and the output signal from the second subtractor 4 is supplied to the non-linear circuit 7. The output signal from the second subtractor 4 is supplied to the input terminal of the VCA 7a and the input terminal of the full-wave rectification circuit 7b. The output signal from the full-wave rectification circuit 7b is fed to a gain control terminal of the VCA 7a, and is used as a control voltage for controlling a gain of the VCA 7a.

At this time, when the level of the output signal from the second subtractor 4 is lower than a determined value, a gain K in the non-linear circuit 7 is set large. When the level is higher than a determined value, the gain K is set small. The determined values which are to be appropriately set and an ideal input-output characteristic of the VCA 7a is easily obtained by designing a control voltage-gain characteristic of the VCA 7a and the gain of the full-wave rectification circuit 7b. The first subtractor 2 subtracts the output signal of the non-linear circuit 7 from the video signal supplied to the input terminal 1, and the output signal from the first subtractor 2 is obtained from the output terminal 6 as an output video signal of the noise reducer.

Figure 3:
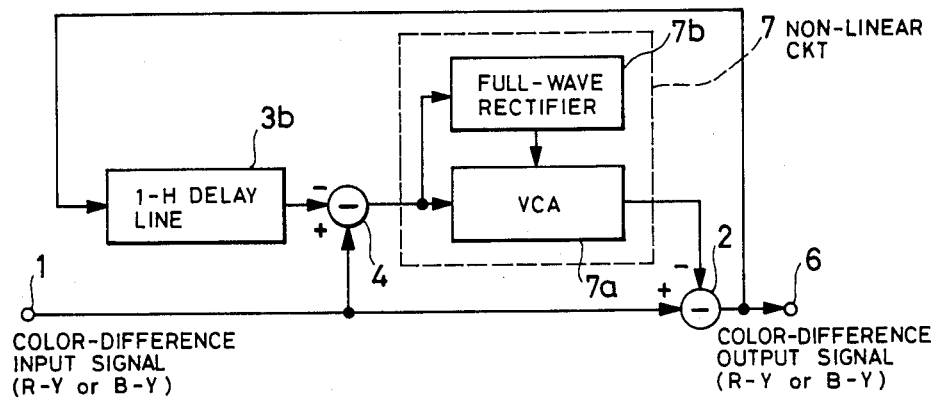
FIG. 3 is a schematic block diagram of a noise reducer showing an embodiment of the present invention.

FIG. 3 is a schematic block diagram of a noise reducer showing an embodiment of the present invention, and FIG. 4 is a circuit diagram showing the second subtractor 4, the VCA 7a, and the full-wave rectification 7b in FIG. 3. In FIG. 3, a 1-H delay line 3b is used, and the output signal from the first subtractor 2 is fed to the 1-H delay line 3b. A color-difference signal R-Y or B-Y is inputted to the input terminal 1.

In FIG. 4, one of the color-difference signals is inputted to an input terminal 8a corresponding to input terminal (+) of the second subtractor 4 of FIG. 3, and then, via a clamping circuit 9a, fed to the base of an NPN transistor $Q_1$ and to the base of an NPN transistor $Q_{15}$. A 1-H delayed color-difference signal which is passed through the 1-H delay line 3b is inputted to an input terminal 8b corresponding to input terminal (−) of the second subtractor 4 of FIG. 3, and then, via a clamping circuit 9b, fed to the base of an NPN transistor $Q_2$ and to the base of an NPN transistor $Q_{16}$. The clamping circuit 9a and the clamping circuit 9b clamps the inputted color-difference signal at the same voltage for clamping, and a clamping pulse cp corresponds to a horizontal synchronizing signal.

The second subtractor 4 shown in FIG. 3 corresponds to a differential amplifier formed of the transistor $Q_1$ and the transistor $Q_2$, and to another differential amplifier formed of the transistor $Q_{15}$ and the transistor $Q_{16}$. A differential amplifier formed of an NPN transistor Q3 and an NPN transistor Q4 corresponds to the VC 7a, and the gain is controlled by the potential difference of the base of the transistor Q3 and the base of the transistor Q4. A differential amplifier formed of an NPN transistor Q5 and an NPN transistor Q6 prevents a dc component of the output of the VCA 7a from changing.

The output of the VCA 7a is an alternating component of the potential of the collector of the transistor Q4, and this potential is outputted to an output terminal 10 via an NPN transistor Q7 forming as an emitter follower. As to constant-current sinks, the following relations are established; $I_1=I_2=I_3$ and $I_{10}=I_{11}$, and the value of a resistor $R_5$ is equal to the value of a resistor $R_6$.

Assuming K is a value of a voltage gain of VCA 7a, the voltage gain K is approximately given by the following formula (1):

$$K = \frac{R_2}{R_1} \cdot \frac{1}{1 + \exp\left\{\frac{-q}{kT}(V_{BQ4} - V_{BQ3})\right\}} \quad (1)$$

where: $V_{BQ3}$ and $V_{BQ4}$ are respectively denote the base voltages of the transistors Q3 and Q4; q is the charge of an electron; k is a Boltzmann constant; T is an absolute temperature. Since $q/(kT)=39/V$ when T=300, the voltage gain K assumes a maximum value when the value of ($V_{BQ4} - V_{BQ3}$) is approximately 100 mV or more. At this time, K assumes approximately $R_2/R_1$. Here, the smaller the value of ($V_{BQ4}-V_{BQ3}$), the smaller the voltage gain K, and then the voltage gain K assumes approximately 0 when the value of ($V_{BQ4}-V_{BQ3}$) is approximately $-100$ mV or less. In addition, the voltage gain K assumes approximately $R_2/2R_1$ when the value of ($V_{BQ4}-V_{CQ3}$) is 0V.

A collector alternating voltage $V_{BQ16}$ of the transistor Q16 corresponds to the in-phase output from the second subtractor 4, and a collector alternating voltage $v_{CQ15}$ of the transistor Q15 corresponds to the anti-phase output from the second subtractor 4. For example, a waveform representing the voltage $v_{CQ16}$ of the transistor Q16 is shown by a full line in FIG. 5A, and a waveform representing the voltage $v_{CQ15}$ of the transistor Q15 is shown by a dotted line in FIG. 5A. Emitter alternating voltage $v_{EQ11}$ (or $v_{EQ12}$) of an NPN transistor Q11 (or Q12) is a voltage obtained by full-wave rectifying the waves of the $v_{CQ15}$ and $v_{CQ16}$ so that the resulted full-wave rectified voltage includes only positive-going waves as shown in FIG. 5B. Emitter alternating voltage $v_{EQ9}$ (or $v_{EQ10}$) of a PNP transistor Q9 (or Q10) is a voltage obtained by full-wave rectifying the waves of the $v_{CQ15}$ and $v_{CQ16}$ so that the resulted full-wave rectified voltage includes only negative-going waves as shown in FIG. 5C.

When the output alternating voltage from the second subtractor 4 is 0V, the following equations are established:

$$(Vcc-R_5 \cdot I_{10})=(Vcc-R_6 \cdot I_{11})$$

Hence, $$V_{BQ11}(=V_{BQ14})=V_{BQ12}(=V_{BQ13})$$

Therefore, the following equation:

$$(V_{BQ4}-V_{BQ3})=R_3 \cdot I_7$$

is given, as the circuit is designed to have the following relations.

$$V_{BEQ11}=V_{BEQ12}=V_{BEQ13}=V_{BEQ14}, \text{ and}$$

$$V_{BEQ8}=V_{BEQ9}=V_{BEQ10}$$

where: $V_{BQ3}$, $V_{BQ4}$, $V_{BQ11}$, $V_{BQ12}$, $V_{BQ13}$, and $V_{BQ14}$ respectively show the base voltages of the transistors Q3, Q4, Q11, Q12, Q13, and Q14; $V_{BEQ8}$, $V_{BEQ9}$, $V_{BEQ10}$, $V_{BEQ11}$, $V_{BEQ12}$, $V_{BEQ13}$, and $V_{BEQ14}$ respectively show the base-emitter voltages of the transistors Q8, Q9, Q10, Q11, Q12, Q13, and Q14.

In addition, the value of $R_3 \cdot I_7$ is determined as 100 mV or more on purpose to obtain a large gain of the VCA 7a when the output alternating voltage from the second subtractor 4 is small.

When the output alternating voltage from the second subtractor 4 is not 0V, the following equation is established:

$$(V_{BQ4}-V_{BQ3})=R_3 \cdot I_7-(v_{EQ11}-v_{EQ9})$$

Since $v_{EQ11}$ is equal to $-v_{EQ9}$, this equation is also expressed by:

$$(V_{BQ4}-V_{BQ3})=R_3 \cdot I_7-2v_{EQ11}$$

where: $v_{EQ9}$ and $v_{EQ11}$ respectively show the emitter alternating voltages of the transistor Q9 and Q11 (see FIGS. 5B and 5C).

As will be understood from the foregoing discussion, the voltage gain K of the VCA 7a is controlled in accordance with the value of $v_{EQ11}$ representing the output signal from the full-wave rectification circuit 7b which corresponds to a magnitude of the output from the second subtractor 4. The voltage gain K of the VCA 7a is expressed as a function of ($V_{BQ4}-V_{BQ3}$), and is changed in accordance with the formula (1). Therefore, the characteristic which is close on the ideal curve shown in FIG. 10 can be obtained.

The waveform of $v_{CQ16}$ illustrated at FIG. 5A shows the in-phase output from the second subtractor 4, and corresponds to the input signal of the non-linear circuit 7. In this case, the output signal from the non-linear circuit 7 corresponds to the output alternating voltage from the VCA 7a, and is shown in FIG. 5D. When the output level of $v_{CQ16}$ is on a determined value Va shown in FIG. 5A, the output level of the non-linear circuit 7 assumes the maximum value. When the output level of $v_{CQ16}$ is on a determined value Vb shown in FIG. 5A, the output level of the non-linear circuit 7 assumes the minimum value. The determined values Va and Vb shown by two-dots lines respectively correspond to input levels Va and Vb shown in FIG. 10. When the level of $v_{CQ16}$ assumes a value such as "b", "d", or "e" illustrated at FIG. 5A, i.e. when the output level of the second subtractor 4 is within an extent determined by the two-dots lines, the output level of VCA 7a increases in accordance with the nncrease in the output signal of the full-wave rectifcation circuit 7b. When the level of $v_{CQ16}$ assumes a value such as "a" or "c" illustrated at FIG. 5A, i.e. when the output level of the second subtractor 4 is out of the determined extent, the output level of the VCA 7a decreases in accordance with the increase in the output signal of the full-wave rectification circuit 7b. The gain of the non-linear circuit 7 is controlled by the above-mentioned operation.

Figure 6:
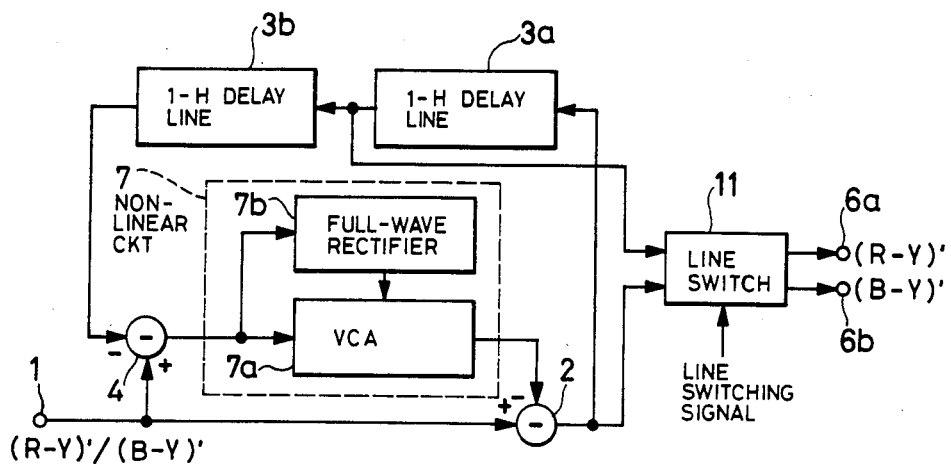
FIG. 6 shows a schematic block diagram of another embodiment of the present invention.

The present invention can be applied to not only the color-difference signal, but also a line sequential color-difference signal, a luminance signal, and a carrier chrominance signal. For instance, FIG. 6 shows another embodiment of the present noise reducer for a line sequential color-difference signal. In FIG. 6, the noise reducer comprises input terminal 1 for receiving a line sequential color-difference signal (R−Y)'/(B−Y)', first subtractor 2, second subtractor 4, non-linear circuit 7 including VCA 7a and full-wave rectification circuit 7b, output terminals 6a and 6b, line switch 11, and 1-H delay lines 3a and 3b. Two 1-H delay lines 3a and 3b are connected each other by a cascade connection. The line sequential color-difference signal (R−Y)'/(B−Y)' is inputted to the input terminal 1. The output signal from the 1-H delay line 3a and the output signal from the first subtractor 2 are inputted to the line switch 11, and are switched in the line switch 11 according to a line switching signal. Therefore, color-difference signals (R−Y)' and (B−Y)' are respectively obtained from the output terminals 6a and 6b.

As will be seen from the above description, in the present invention, the noise reducer is adapted to the processings of an analog signal, and has an improved non-linear characteristic in comparison with the conventional noise reducer using the limiter without increase in the manufacturing cost. In addition, the noise reducing circuit of the present invention is easily produced as an integrated circuit.

The above-described embodiments are just examples of the present invention, and therefore, it will be apparent for those skilled in the art that many modifications and variations may be made without departing from the scope of the present invention.

What is claimed is:

1. A noise reducing circuit for a video signal, comprising:
    (a) a delaying means for delaying said video signal;
    (b) a first subtracting means for subtracting an output signal of said delaying means from said video signal;
    (c) a full-wave rectification circuit means for full-wave rectifying said output signal from said first subtracting means;
    (d) a gain control circuit means for controlling an amplitude of said output signal from said first subtracting means in accordance with an output signal from said full-wave rectification circuit means; and
    (e) a second subtracting means for subtracting an output signal of said gain control circuit from said video signal thereby producing an output signal of said noise reducing circuit.

2. A noise reducing circuit for a video signal as claimed in claim 1, wherein said gain control circuit means controls said amplitude such that said output signal of said gain control circuit means increases in accordance with the increase in an output signal from said full-wave rectification circuit means when said output signal of said first subtracting means is within a determined extent, and that said output signal of said gain control circuit means decreases in accordance with the increase in said output signal from said full-wave rectification circuit means when said output signal of said first subtracting means is out of the determined extent.

3. A noise reducing circuit for a video signal, comprising:
    (a) a first subtracting means responsive to said video signal;
    (b) a delaying means for delaying an output signal from said first subtracting means;
    (c) a second subtracting means for subtracting an output signal of said delaying means from said video signal;
    (d) a full-wave rectification circuit means for full-wave rectifying said output signal from said second subtracting means; and
    (e) a gain control circuit means for controlling an amplitude of said output signal from said second subtracting means in accordance with an output signal from said full-wave rectification circuit means, an output signal from said gain control circuit being fed to said first subtracting means to be subtracted from said video signal.

4. A noise reducing circuit for a video signal as claimed in claim 3, wherein said gain control circuit means controls said amplitude such that said output signal of said gain control circuit means increases in accordance with the increase in an output signal from said full-wave rectification circuit means when said output signal of said second subtracting means is within a determined extent, and that said output signal of said gain control circuit means decreases in accordance with the increase in said output signal from said full-wave rectification circuit means when said output signal of said second subtracting means is out of the determined extent.

5. A noise reducing circuit for a video signal as claimed in claim 4, wherein said delaying means includes first 1-H delaying means and second 1-H delaying means which are connected by a cascade connection each other, and further comprising a line switching means for switching an output signal from said first 1-H delaying means and an output signal from said first subtracting means.

* * * * *